(12) United States Patent
Silverbrook et al.

(10) Patent No.: US 7,557,829 B2
(45) Date of Patent: Jul. 7, 2009

(54) DEVICE THAT READS DATA ENCODED AS DOTS

(75) Inventors: Kia Silverbrook, Balmain (AU); Paul Lapstun, Balmain (AU); Simon Robert Walmsley, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 750 days.

(21) Appl. No.: 10/636,219

(22) Filed: Aug. 8, 2003

(65) Prior Publication Data

US 2004/0032505 A1 Feb. 19, 2004

Related U.S. Application Data

(63) Continuation of application No. 09/693,226, filed on Oct. 20, 2000, now Pat. No. 6,943,830.

(51) Int. Cl.
 *H04N 5/225* (2006.01)
(52) U.S. Cl. ................................. 348/207.99
(58) Field of Classification Search ............ 348/207.99; 345/582; 358/1.9; 714/762
See application file for complete search history.

(56) References Cited

U.S. PATENT DOCUMENTS

| | | | |
|---|---|---|---|
| 4,837,628 A | 6/1989 | Sasaki | |
| 4,937,676 A | 6/1990 | Finelli et al. | |
| 5,067,713 A * | 11/1991 | Soules et al. | 273/149 P |
| 5,184,169 A | 2/1993 | Nishitani | |
| 5,288,980 A | 2/1994 | Patel et al. | |
| 5,337,361 A | 8/1994 | Wang et al. | |
| 5,734,154 A | 3/1998 | Jachimowicz et al. | |
| 5,771,245 A * | 6/1998 | Zhang | 714/762 |
| 5,825,947 A | 10/1998 | Sasaki et al. | |
| 5,835,136 A | 11/1998 | Watanabe et al. | |
| 5,847,698 A * | 12/1998 | Reavey et al. | 345/173 |
| 5,893,132 A * | 4/1999 | Huffman et al. | 715/532 |
| 5,996,893 A * | 12/1999 | Soscia | 235/462.01 |
| 6,094,279 A * | 7/2000 | Soscia | 358/1.9 |
| 6,106,147 A | 8/2000 | Silverbrook | |
| 6,107,988 A * | 8/2000 | Phillipps | 345/156 |
| 6,123,263 A | 9/2000 | Feng | |
| 6,177,683 B1 | 1/2001 | Kolesar et al. | |
| 6,320,591 B1 * | 11/2001 | Griencewic | 345/582 |
| 6,331,867 B1 * | 12/2001 | Eberhard et al. | 715/864 |
| 6,441,921 B1 * | 8/2002 | Soscia | 358/1.9 |
| 6,542,622 B1 * | 4/2003 | Nelson et al. | 382/112 |
| 6,603,259 B1 * | 8/2003 | Kiryuschev et al. | 313/505 |

FOREIGN PATENT DOCUMENTS

| | | |
|---|---|---|
| EP | 907139 | 4/1999 |
| EP | 913814 | 5/1999 |
| EP | 0935384 A | 8/1999 |
| EP | 974924 | 1/2000 |

* cited by examiner

*Primary Examiner*—James M Hannett

(57) ABSTRACT

A system is disclosed for reading data encoded as a series of invisible dots carried on a substrate. The system has a detector that detects the dots on the substrate and outputs a first signal; a decoder interconnected to the detector that decodes the first signal to produce an output signal; and an output device interconnected to the processor that receives the output signal and creates a corresponding human readable output. The dots may be infrared absorbing and the encoding can include Reed-Solomon encoding of the prerecorded audio. The system can include a wand-like arm having a slot through which the photograph is inserted.

5 Claims, 1 Drawing Sheet

DEVICE THAT READS DATA ENCODED AS DOTS

CROSS-REFERENCE TO RELATED APPLICATIONS

This is a Continuation of U.S. application Ser. No. 09/693,226 filed on Oct. 20, 2000, now U.S. Pat. No. 6,943,830.

FIELD OF THE INVENTION

The present invention relates to a user interface system for recovering digital data printed in infra-red ink in a fault tolerant encoded form on a print media using an inkjet printing system. In particular, the data may be encoded on the same surface as a human readable representation, for example an image which is related to the data which is encoded thereon.

CO-PENDING APPLICATIONS

Various methods, systems and apparatus relating to the present invention are disclosed in the following co-pending applications filed by the applicant or assignee of the present invention simultaneously with the present application:
U.S. patent application Ser. Nos.
6,496,654
6,859,225
6,924,835
6,647,369
09/693,317
The disclosures of these co-pending applications are incorporated herein by reference.

Various methods, systems and apparatus relating to the present invention are disclosed in the following co-pending application filed by the applicant or assignee of the present invention on Jul. 10, 1998:
U.S. Ser. No. 6,476,863
U.S. Ser. No. 6,459,495
The disclosures of this co-pending application are incorporated herein by reference.

Various methods, systems and apparatus relating to the present invention are disclosed in the following co-pending applications filed by the applicant or assignee of the present invention on Jun. 30, 2000:
U.S. Ser. Nos.
6,471,331
6,676,250
6,347,864
6,439,704
6,425,700
6,588,952

The disclosures of these co-pending applications is incorporated herein by reference.

BACKGROUND OF THE INVENTION

The applicant has disclosed in pending applications U.S. Ser. Nos. 09/113,070 and 09/112,785 cards called Artcards in which the information is encoded in black ink on a white background on the reverse face of the printed card, the front surface of the card bearing an image. The data that may be recorded may be the contents of a book recorded in a digital manner with the front face bearing an image equivalent to the dust jacket of the book.

In such prior art, two printheads are required in order to simultaneously print the image on the front of the card and the digital data on the rear of the card. To read the card, the card is passed through an optical scanning means and the fault tolerant encoded data is reconstructed and decoded and provided to a user as an audio or visual output.

SUMMARY OF THE INVENTION

The present invention provides a user interface for reading data encoded in a fault tolerant form in infra-red ink on a surface simultaneously bearing an image.

It is an object of the present invention to provide an apparatus for reading data encoded in a fault tolerant digital form printed in invisible ink on a surface of a card said surface bearing an image comprising:
 a) scanning means for scanning said encoded fault tolerant digital form of said data on said surface in the infra-red;
 b) means for processing said scanned data and for decoding said data into a secondary digital format;
 c) means for outputting said data in said secondary digital format to an output device with which said secondary digital format is usable;
 d) said output device presenting said data in a human readable form.

Preferably the invisible ink may be an infra-red (IR) absorbing ink with negligible absorption in the visible spectrum.

Preferably, the data is encoded on the card using a Reed-Solomon encoding process after compression of the data. This allows recovery of the data notwithstanding up to 30% damage to the print media upon which the data is recorded (image encoded form). The card for example may be a standard card as disclosed in co-pending applications lodged hereto U.S. Ser. Nos. 09/693,471, 09/693,083 and 09/693,134 of the size of a photograph of approximately 4"×6" (102 mm×152 mm). It is also contemplated that other formats are also possible for the card for example of the same width but shorter or longer depending upon the amount of data which is recorded or to be recorded on the print media.

In another aspect, the invention provides a device for reading data encoded as an array of dots carried on a substrate, the array being substantially invisible to an average unaided human eye, the device comprising:
 a detector that detects the array of dots and outputs a first signal representative thereof;
 a decoder interconnected to said detector that receives and decodes said first signal to produce a second signal corresponding to the first signal; and
 an output device interconnected to said decoder that receives said second signal and creates a human readable output corresponding to the second signal.

The detector may detect the array of dots optically.

The dots may be dots of ink and the ink may be an infra-red (IR) absorbing ink with little absorption in the visible spectrum.

In accordance with a further aspect of the present invention, there is provided a method of creating a human readable output from an array of dots carried by a substrate, the array encoding data and being substantially invisible to an average unaided human eye, said method comprising the steps of:
 (a) detecting the array on the substrate and outputting a first signal corresponding thereto;
 (b) decoding said first signal and outputting a second signal
 (c) receiving the second signal in an output device and generating a human readable output corresponding to the second signal.

The array of dots may be detected optically and may be detected using at least the infrared spectrum. The dots may be provided using an infrared absorbing ink with little absorption in the visible spectrum.

The substrate may also carry an image, a substrate carrying an image and including an array being substantially identical, to an average unaided human eye, to the same substrate and image not including an array.

BRIEF DESCRIPTION OF THE DRAWINGS

Notwithstanding any other form which may fall within the scale of the present invention, preferred forms of the invention will now be described by way of example only with reference to the accompanying drawing of FIG. 1 which illustrates the card reading arrangement of the preferred embodiment.

DESCRIPTION OF THE PREFERRED AND OTHER EMBODIMENTS

Figure 1:
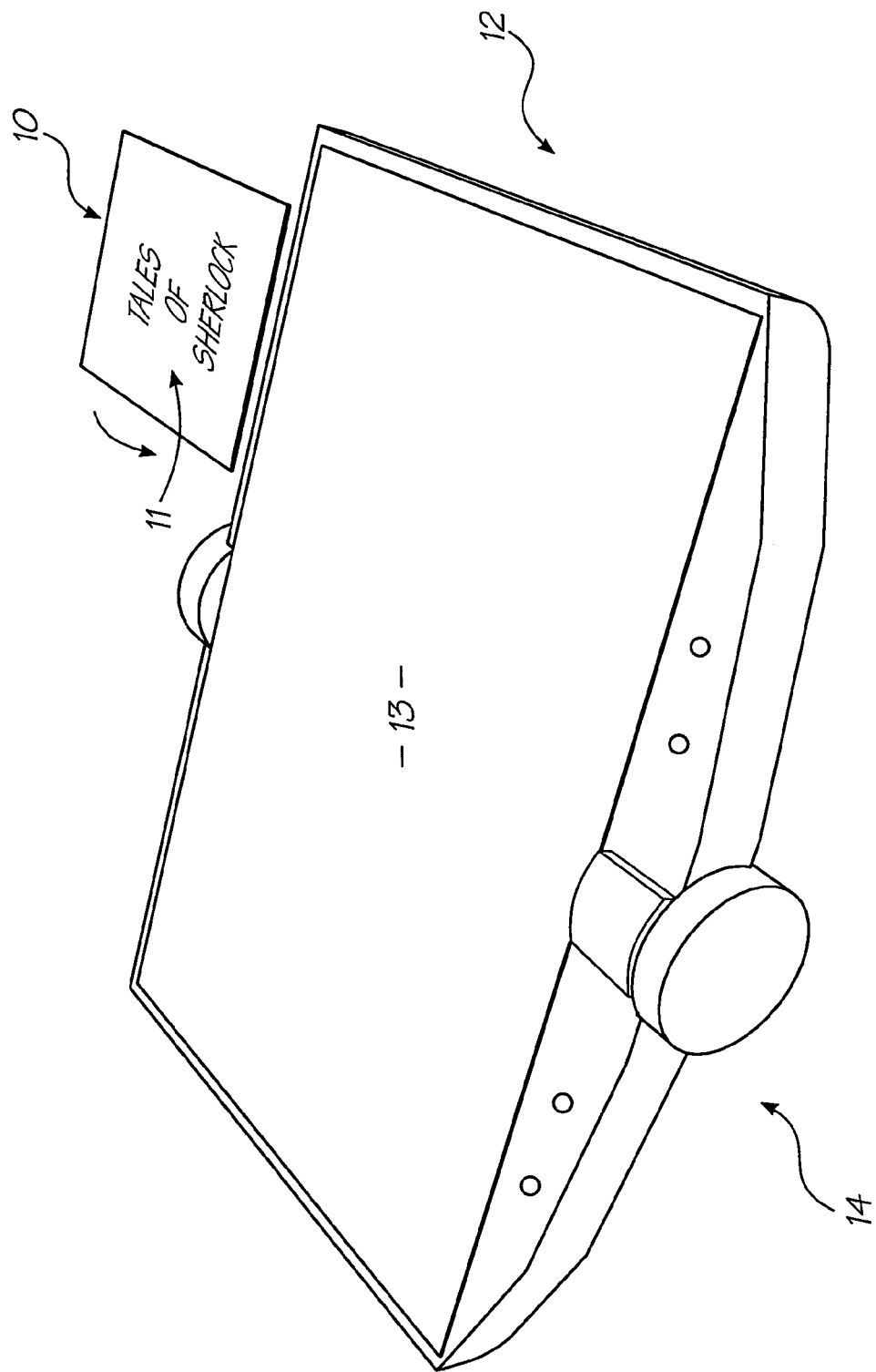

The preferred embodiment is preferably implemented through suitable programming of a hand held device such as that described in the applicant's applications U.S. Ser. Nos. 09/693,471, 09/693,083 and 09/693,134 filed concurrently herewith by the present applicant the content of which is hereby specifically incorporated by reference. These applications make reference to the applicant's prior applications U.S. Ser. Nos. 09/113,070 and 09/112,785.

The aforementioned patent specifications disclose an apparatus including a camera system, hereinafter known as an "Artcam" type camera system, wherein sensed images can be directly printed out by the camera unit using an inkjet pagewidth printhead having at least four separate inkjet nozzles for printing a color image and an infra-red image simultaneously on a print media. A pagewidth printhead of this type was described by the applicant in co-pending applications U.S. Ser. Nos. 09/608,308, 09/608,779, 09/607,987, 09/608,776, 09/607,250, and 09/607,991 and the descriptions thereof are hereby specifically incorporated by reference.

In the above referenced patent specifications, namely U.S. Ser. Nos. 09/693,471, 09/693,083 and 09/693,134, data in a fault tolerant encoded form is printed in infrared ink over a color image. The data which was described in each of these specifications related respectively to storing a fault tolerant encoded digital form of the image itself, a fault tolerant encoded digital form of the image itself along with an image processing program script which enabled the image to be processed to produce a given effect thereon, and a copy of the image itself and of a transformed copy of that image, the transformation being achieved by a program which could be separately loaded into the camera system.

In the present application, the invention resides in recording digital data on an image, the digital data relating to other than the image itself or any manipulation thereof. For example, as described in the applicant's prior art of U.S. Ser. No. 09/113,070 a card may be printed using a fault tolerant digitally encoded form comprising a book on one surface of a print media while on the other face of the print media an image is recorded, for example in this case the dust jacket of the book. The cards that were described were of the size of a credit card of approximately 85 mm×55 mm size. The card was printed on both faces. In the present invention the card needs only to be printed on one face with the data being recorded in infra red ink and thus invisible to a human reader. As described in the applicant's co-pending applications U.S. Ser. Nos. 09/693,471, 09/693,083 and 09/693,134, a card of approximate size 4"×6" (102 mm×152 mm) can contain approximately 3-4 megabytes of data depending on how the data is encoded and distributed across the surface of the card. The data in those applications is distributed in such a way that full recovery of the data there encoded, namely an image, can be recovered even if up to 30% damage has occurred to the surface of the card. To store an average page of text requires approximately 2 Kbytes of digital data for text only, hence 3 megabytes of data would record approximately 1.5 thousand pages of written text. An average book contains between 250-550 pages and such a book is readily accommodated by the format of the present disclosure. In addition, images may be interspersed with the text as thumbnail (reduced sized) images in a suitable file format for example jpeg, gif, tiff, bmp to name a few.

The preferred embodiment provides an adaptation of the particular technology as disclosed in the aforementioned patent specifications U.S. Ser. Nos. 09/693,471, 09/693,083 and 09/693,134. In this adaptation, the camera system and the printing system is dispensed with and replaced with a large screen reader. The cards according to the preferred embodiment are then provided having an indicator of the information which is recorded on the card. The information in a fault tolerant encoded form is printed in infrared ink over that indicator. For example the card could include a book's content or a newspaper content. An example of such a system is as illustrated in FIG. 1 wherein the card 10 includes a book title on the card with data printed thereon in infra-red ink as shown by arrow 11. The card 10 is inserted in the reader 12 which includes a flexible display 13 which allows for the folding up of the card reader 12. The card reader includes display controls 14 which allow for paging forward and back and other controls of the card reader 12.

It can therefore be seen that the arrangement of FIG. 1 provides for an efficient distribution of information in the form of books, newspapers, magazines, technical manuals, and so forth.

Various inkjet technologies can be used for printing of the card according to the current disclosure, for example an inkjet pagewidth printhead such as disclosed in the applicant's co-pending applications U.S. Ser. Nos. 09/608,308, 09/608,779, 09/607,987, 09/608,776, 09/607,250, and 09/607,991 may be used. Suitable infra-red ink is disclosed in the applicant's co-pending applications, Australian provisional patent applications PQ9412 and PQ9376 filed on 14 Aug. 2000 and applicant's applications PQ9509 filed on 18 Aug. 2000, and PQ9571, and PQ9561 filed on 21 Aug. 2000. Data may be encoded in a manner or using a format as disclosed in applicant's U.S. Ser. Nos. 09/113,070 and 09/112,785, or 09/693,471, 09/693,083 and 09/693,134, for example the Artcard format or the alternative Artcard format. Other formats may be used.

It would be appreciated by a person skilled in the art that numerous variations and/or modifications may be made to the present invention as shown in the specific embodiment without departing from the spirit or scope of the invention as broadly described. The present invention is, therefore, to be considered in all respects to be illustrative and not restrictive.

The invention claimed is:

1. A device for reading book data, the device comprising:
   a housing including first and second housing sections connected by a hinge;
   a flexible display positioned in the housing to extend from the first housing section to the second housing section over the hinge so as to be of approximately equal width to the housing, the flexible display configured to flexibly fold about the hinge;

a slot for receiving a card having visible content printed thereon, the card further having the book data encoded on the surface of the card as an array of dots, the array of dots being printed on the surface in ink substantially invisible to an average unaided human eye and being printed on the surface independently of the visible content printed on the surface;

a detector for optically detecting the array of dots across the surface of the card received in the slot and for outputting a first signal representative thereof;

a decoder interconnected to said detector for receiving and decoding said first signal to produce a display signal corresponding to the first signal;

wherein the display signal causes text or images corresponding to the book data to be displayed on said flexible display.

2. A device according to claim 1 further comprising display controls which allow for paging forward and back.

3. The device of claim 1 wherein the dots are dots of ink.

4. The device of claim 3 wherein the ink is infrared absorbing ink with little absorption in the visible spectrum.

5. The device of claim 1 wherein said data is encoded using Reed-Solomon encoding.

* * * * *